(12) United States Patent
Lee

(10) Patent No.: US 7,145,126 B2
(45) Date of Patent: Dec. 5, 2006

(54) OPTICAL POSITION ENCODER DEVICE USING INCOHERENT LIGHT SOURCE

(76) Inventor: Wai-Hon Lee, 1245 Magdalena Ct., Los Altos, CA (US) 94024

( * ) Notice: Subject to any disclaimer, the term of this patent is extended or adjusted under 35 U.S.C. 154(b) by 82 days.

(21) Appl. No.: 10/802,669

(22) Filed: Mar. 16, 2004

(65) Prior Publication Data
US 2005/0205770 A1   Sep. 22, 2005

(51) Int. Cl.
G01D 5/34 (2006.01)
G01D 5/36 (2006.01)
G01B 11/14 (2006.01)
(52) U.S. Cl. ............ 250/231.13; 356/616; 250/231.14; 250/237 G
(58) Field of Classification Search ............ 250/237 R, 250/237 G, 231.1–231.18; 356/616, 617
See application file for complete search history.

(56) References Cited

U.S. PATENT DOCUMENTS

| | | | |
|---|---|---|---|
| 5,068,530 A * | 11/1991 | Ieki et al. | 250/237 G |
| 5,302,820 A | 4/1994 | Henshaw et al. | 250/231.16 |
| 5,424,833 A * | 6/1995 | Huber et al. | 356/499 |
| 5,889,280 A | 3/1999 | Matsuura | 250/237 G |
| 6,175,414 B1 * | 1/2001 | Holzapfel et al. | 356/620 |
| 6,486,467 B1 * | 11/2002 | Speckbacher et al. | 250/237 G |
| 6,791,699 B1 * | 9/2004 | Aoki | 356/616 |

FOREIGN PATENT DOCUMENTS

EP    0 714 015 A    5/1996

OTHER PUBLICATIONS

J. Willhelm: "Dreigitterschrittgeber" 1978, Technische Universität Hannover, XP002327534, pp. 28-51.

* cited by examiner

*Primary Examiner*—Georgia Epps
*Assistant Examiner*—Brian Livedalen
(74) *Attorney, Agent, or Firm*—Townsend and Townsend and Crew, LLP

(57) ABSTRACT

An optical device that includes a grating (for example a moving reflective grating) and a light source disposed opposing a predetermined side of the grating. The optical device also includes a first reference grating (e.g., a fixed grating) disposed between the light source and the grating, a detector disposed opposing the predetermined side of the grating and a second reference grating (e.g., a fixed grating) disposed between the detector and the grating. The grating, first reference grating and light source are configured for movement relative to one another. For example, the grating can be moveable while the light source and first reference grating are fixed.

11 Claims, 5 Drawing Sheets

OPTICAL POSITION ENCODER DEVICE USING INCOHERENT LIGHT SOURCE

CROSS-REFERENCES TO RELATED APPLICATIONS

Not Applicable

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

The present invention relates to optical encoders, and in particular encoders using a hologram or other grating to read a moving grating, such as a CD.

Many conventional optical position encoder devices (also referred to as position sensors) illuminate the moving grating thereof using a incoherent light source which includes numerous independent point sources of different wavelengths. U.S. Pat. No. 4,879,510, U.S. Pat. No. 4,472,629 and U.S. Pat. No. 4,691,101, each of which is hereby incorporated in full by reference for all purposes, are examples of such optical position encoder devices.

FIG. 1(a) illustrates the basic principles of a conventional optical position encoder device 100. In conventional optical position encoder 100, an incoherent light source 101 illuminates a moving binary grating 102 (with the direction of movement indicated by the arrows). Moreover, a fixed grating 103 with the same period as moving binary grating 102 is placed adjacent to the moving binary grating. As the moving binary grating 102 moves across (e.g., along or parallel to) fixed grating 103, the amount of light falling on detector 104 (depicted by a dashed line in FIG. 1(a)) is dependent on the alignments of gratings 102 and 103. The largest amount of light is detected when gratings 102 and 103 are aligned in phase and the least amount of light is detected when grating 102 and 103 are aligned out of phase. The contrast of the modulated light is dependent on the adjacency (i.e., separation) of gratings 102 and 103. If the two grating are apart by more than a few periods of the gratings, detector 104 can not be used to sense the position of moving binary grating 102.

In order to increase the distance between gratings 102 and 103 beyond a few periods of the gratings, a conventional optical position encoder device configuration that includes a lens is used. Such a configuration is shown in FIG. 1(b). In FIG. 1(b), optical position encoder device 110 employs a lens 107 between a moving grating 106 and a fixed grating 108. Lens 107 produces an image of moving grating 106 on fixed grating 108. Also illustrated in FIG. 1(b) are an incoherent light source 105 and a detector 109 of optical position encoder device 110.

FIG. 2 shows an optical position encoder device 200 that is similar to optical position encoder device 110. However, in optical position encoder device 200, light source 201 and detector 205 are on the same side of the moving grating 202. Again, a lens 203 images moving grating 202 to fixed grating 204 disposed in front of detector 205.

The resolution of the conventional optical position encoder devices depicted in FIGS. 1(b), 1(b) and 2 is rather low. At the same time, the output signal from such optical position encoder devices is binary and not sinusoidal. These drawbacks make such conventional optical devices unsuitable for use as a high-resolution optical position encoder device.

SUMMARY OF THE INVENTION

Optical devices according to the present invention, such as optical position encoder devices, have high resolution and can, for example, produce a sinusoidal output signal. The present invention eliminates the need for a lens in such an optical device by adding a second fixed grating. This is also accomplished without the need to rely on a self-imaging aspect of a media.

An embodiment of an optical device according to the present invention includes a grating (for example a moving reflective grating) and a light source (for example, an incoherent light source such as a light emitting diode or multi-mode semiconductor laser) disposed opposing a predetermined side of the grating. The optical device also includes a first reference grating (e.g., a fixed first reference grating) disposed between the light source and the grating, a detector (e.g., a photodetector) disposed opposing the predetermined side of the grating and a second reference grating (e.g., a second fixed reference grating) disposed between the detector and the grating. The grating, first reference grating and light source are configured for movement relative to one another. For example, the grating can be moveable while the light source and first reference grating are fixed.

Another embodiment of an optical device according to the present invention is an optical position encoder that includes a moving grating with a period $T_s$, and a photodetector with light sensitive components. This optical position encoder also includes a light source disposed on the photodetector chip, a first fixed grating with a spatial period $T_r$ disposed on the light source and at least one second fixed grating (for example, a plurality of sinusoidal second fixed gratings) with a period T disposed on the light sensitive components.

Several unique aspects of the an optical devices according to the present invention provide for high resolution and a sinusoidal output signal including (1) the optical devices can, for example, contain two fixed (reference) gratings in addition to a moving grating, with one of the fixed gratings placed in front of the light source (i.e., between the light source and the moving grating) and the other fixed grating placed between a detector and the moving grating (e.g., directly on top of the detector); (2) the moving grating can be, for example, separated from the fixed gratings by a distance that is greater than a few periods of the moving grating and yet no lens is required between the moving grating and the detector; and (3) the output signal from the detector can be, for example, a sinusoidal signal when the fixed grating placed above the detector is a sinusoidal grating. Furthermore, the periods of the fixed gratings can be related to the period of the moving grating according to a mathematical formula (discussed below) that provides for an interference pattern at the detector to be independent of the separation of the light source and the first fixed (or reference) grating and for there to be no restriction on the separation between the first fixed (or reference) grating and the (moving) grating.

DETAILED DESCRIPTION OF THE INVENTION

Figure 1A:
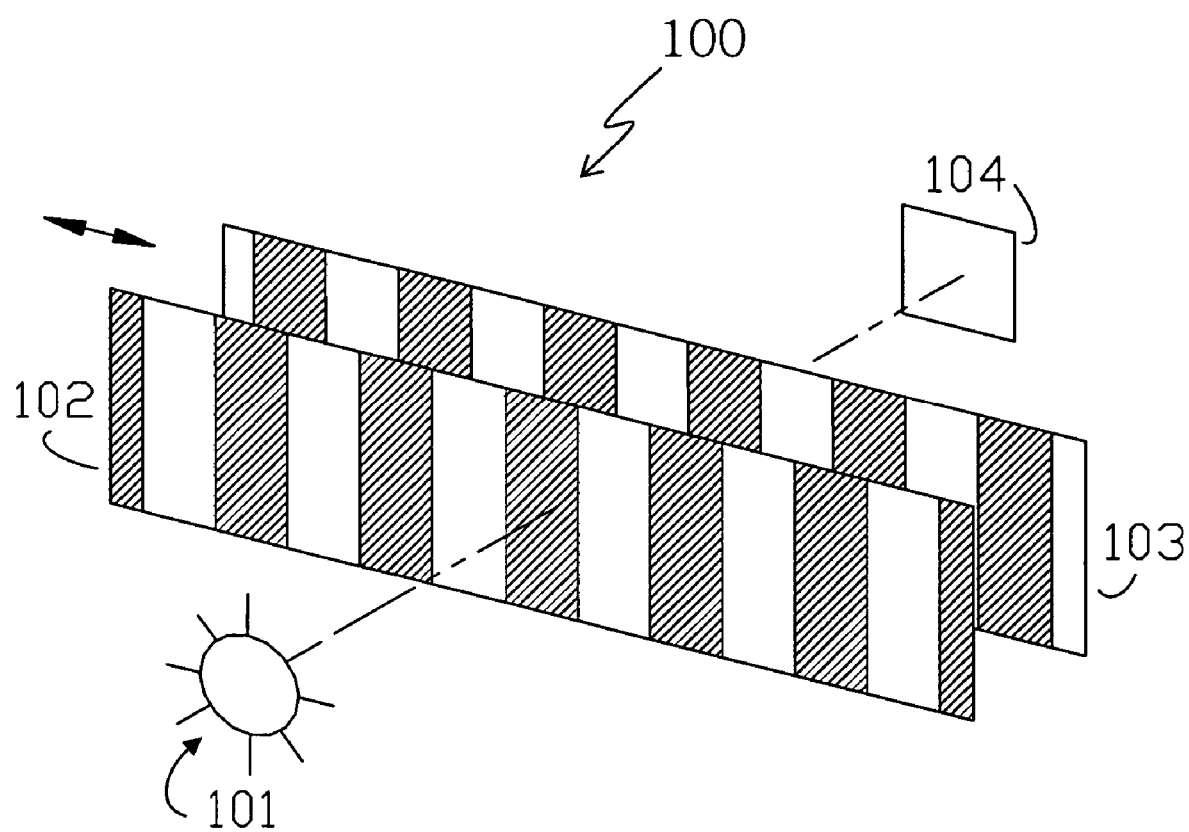
FIG. 1(a) is a simplified depiction of a conventional optical position encoder device.
Figure 1B:
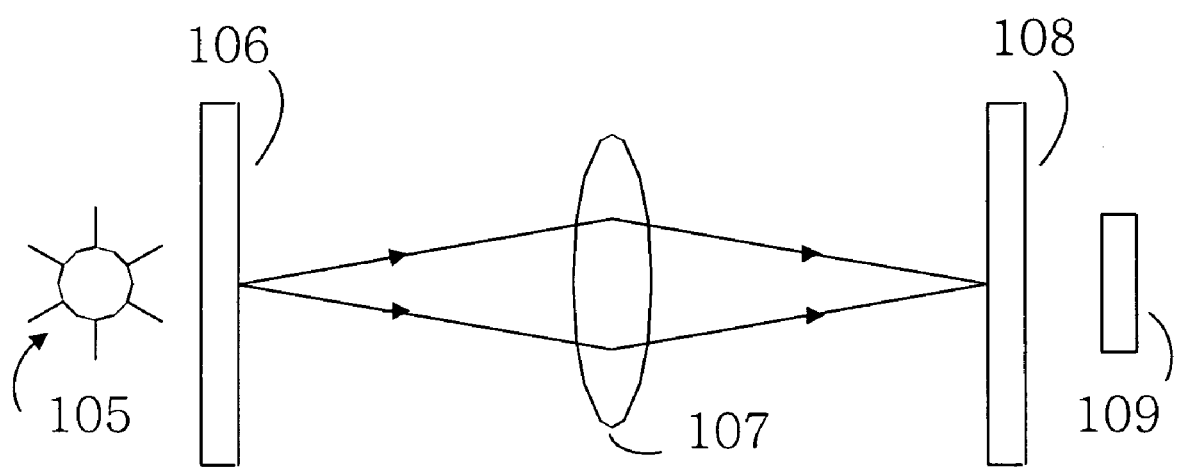
FIG. 1(b) is a simplified depiction of conventional optical position encoder device that includes a lens.
Figure 2:
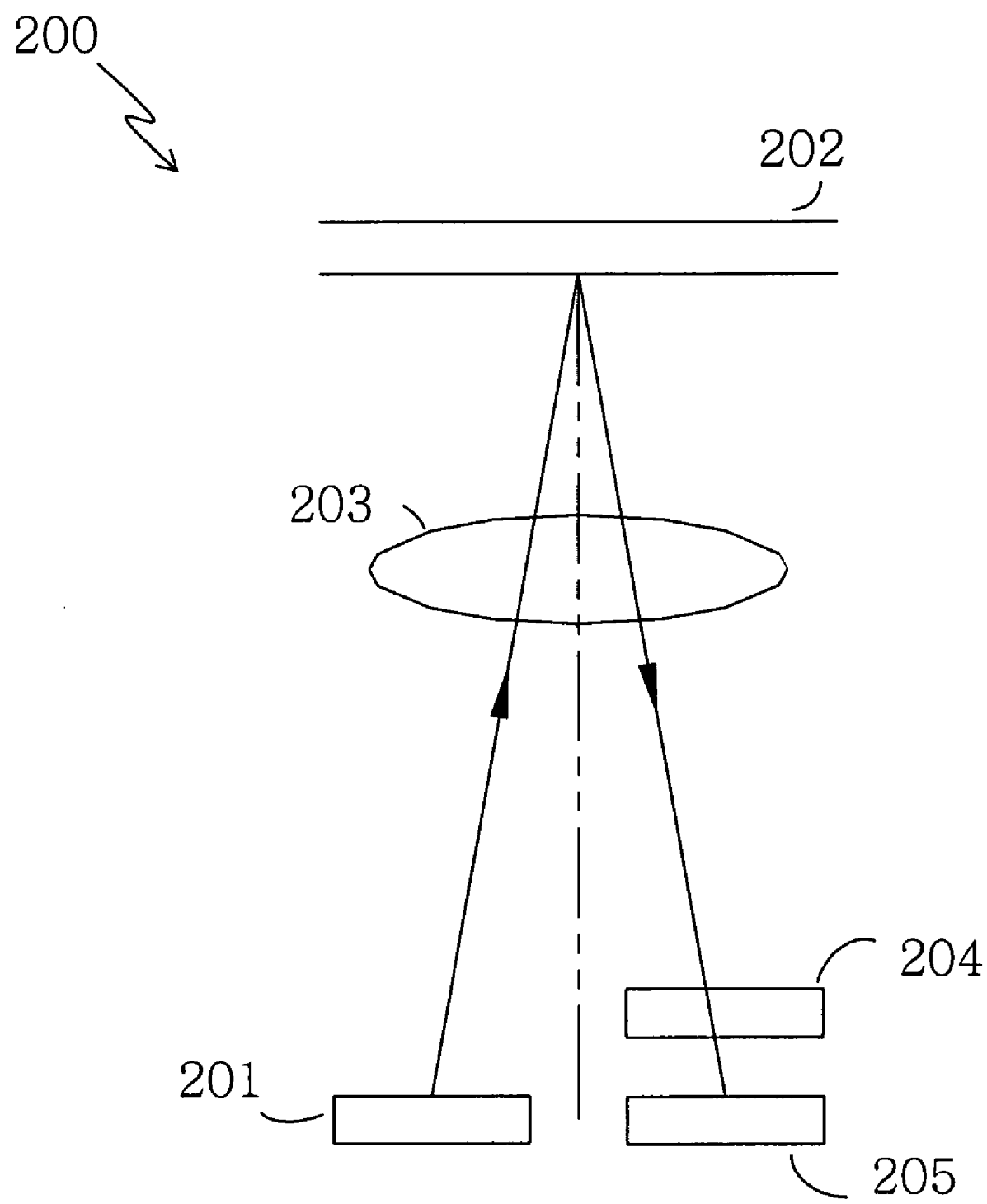
FIG. 2 is a simplified depiction of yet another conventional optical position encoder with the arrows indicating directions of light travel and the dashed line indicating a centerline of the optical position encoder.
Figure 3:
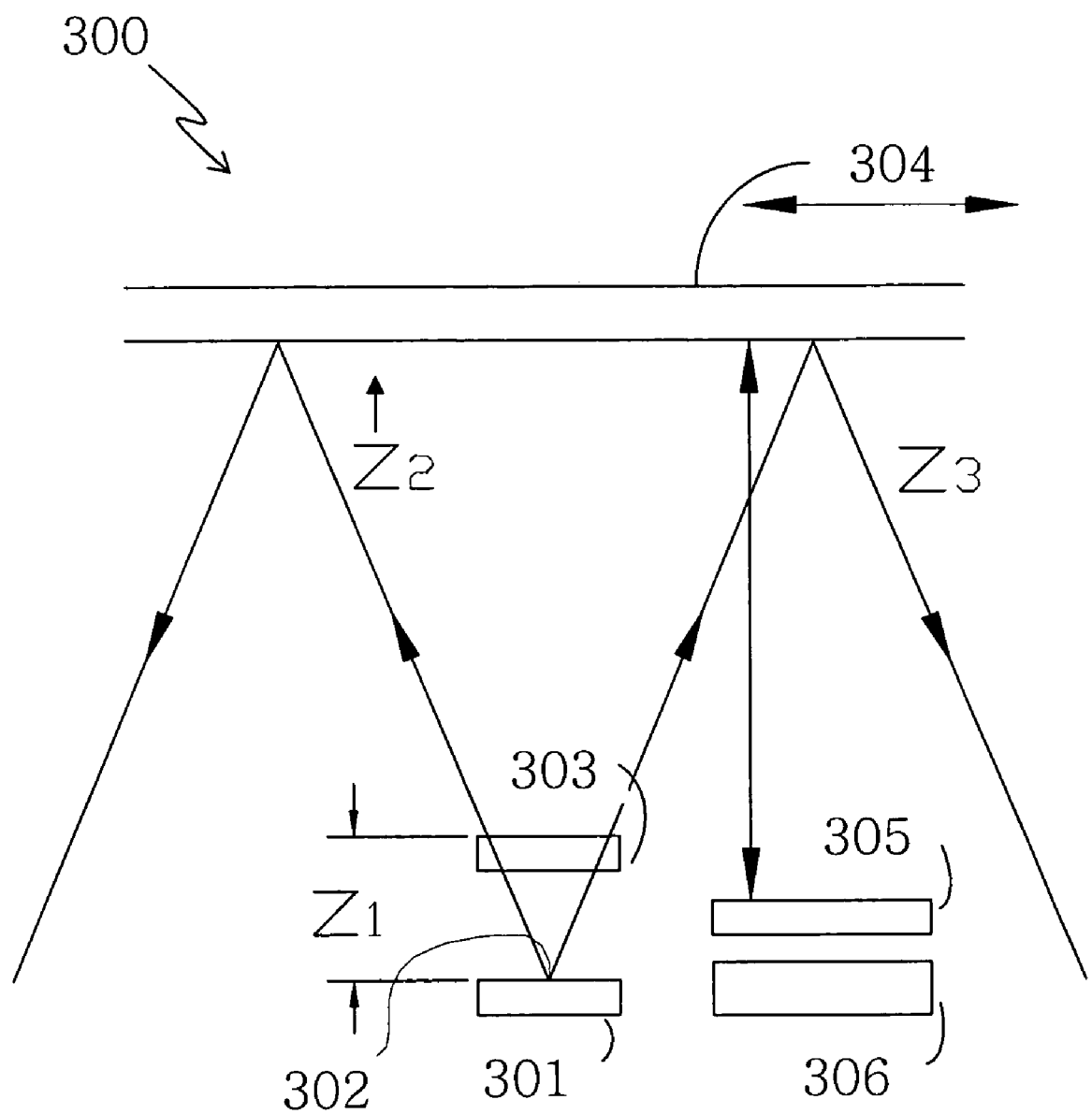
FIG. 3 is a simplified depiction of an optical device according to the present invention with the arrows nearest label 304 indicating movement direction for element 304.

FIG. 3 depicts an embodiment of an optical device 300 (for example, an optical position encoder device) according to the present invention. As illustrated in FIG. 3, optical device 300 includes incoherent light source 301, a first fixed grating 303, a moving grating 304, a second fixed grating 305 and a detector 306. The moving grating is a CD or DVD in one embodiment.

Although a one-dimensional incoherent light source is used in the following analysis, the result can be applied to a two-dimensional light source as well. In FIG. 3, point source 302 is one of a plurality of point sources included in incoherent light source 301. Arrowed lines originating from point source 302 indicate directions of light travel. The wavefront from light source 301, after passing through first fixed (reference) grating 303, is given by $$u(x, Z = Z_1) = \exp\left\{\frac{i\pi(x-x')^2}{\lambda Z_1}\right\} * \left[a_0 + 2a_1 \cos\left\{\frac{2\pi x}{T_r}\right\}\right], \quad (1)$$

where $\lambda$ is the wavelength of point source 302. The first term in Eq. (1) represents the wavefront from point source 302 and the second term represents the transmission of the first fixed (reference) grating 303 with period $T_r$. The wave from point source 302 propagates through the first fixed (reference) grating 303 at plane Z1 (in other words, first fixed grating 303 is disposed a distance $Z_1$ from light source 301) to moving grating 304 with period $T_s$ at plane Z2 (which is a distance between 303 and 304) and all the way to the detector plane at $Z_3$. At the detector plane $Z_3$, the conditions with which the periodic signal is independent of the source location x' can be determined. The function in Eq. (1) can be rewritten as follows:

$$u(x, t, Z = Z_1) = a_0 \exp\left\{\frac{i\pi(x-x')^2}{\lambda Z_1}\right\} + \quad (2)$$

$$a_1 \exp\left\{\frac{i\pi(x-x'+\lambda Z_1/T_r)^2}{\lambda Z_1} + i2\pi x'/T_r - \left(\frac{\lambda Z_1}{T_r}\right)^2\right\}$$

$$u(x, t, Z = Z_1) = a_0 \exp\left\{\frac{i\pi(x-x')^2}{\lambda Z_1}\right\} +$$

$$a_1 \exp\left\{\frac{i\pi(x-x'+\lambda Z_1/T_r)^2}{\lambda Z_1} + i2\pi x'/T_r - \left(\frac{\lambda Z_1}{T_r}\right)^2\right\} +$$

$$a_1 \exp\left\{\frac{i\pi(x-x'-\lambda Z_1/T_r)^2}{\lambda Z_1} - 2i\pi x'/T_r - \left(\frac{\lambda Z_1}{T_r}\right)^2\right\}$$

Eq. (2) indicates that the first fixed grating 303 divides the light source into three light sources locating at x=0 and x=x'. The waves from these three point light sources then reach moving grating 304 with period Ts at a distance $Z_2$ from first fixed grating 303. Although it is assumed for the sake of discussion that moving grating 304 moves with respect to the light source 302 and the first fixed (reference) grating 303, the result is the same when the light source 302 and first fixed reference grating 303 move with respect to the moving grating 304. The waves incident on moving grating 304 are obtained by replacing the parameter $Z_1$ in the denominators in Eq. (2) by $(Z_1+Z_2)$. The result is shown below:

$$u(x, Z = Z_1 + Z_2) = a_0 \exp\left\{\frac{i\pi(x-x')^2}{\lambda(Z_1+Z_2)}\right\} + \quad (3)$$

$$a_1 \exp\left\{\frac{i\pi(x-x'+\lambda Z_1/T_r)^2}{\lambda(Z_1+Z_2)} + \frac{2\pi x'}{T_r} - \left(\frac{\lambda Z_1}{T_r}\right)^2\right\} +$$

$$a_1 \exp\left\{\frac{i\pi(x-x'-\lambda Z_1/T_r)^2}{\lambda(Z_1+Z_2)} - \frac{2\pi x'}{T_r} - \left(\frac{\lambda Z_1}{T_r}\right)^2\right\}$$

The wavefront after passing through the moving grating 304 at $Z=Z_1+Z_2$ is given by $$S(x, t, Z = Z_1 + Z_2) = u(x, Z = Z_1 + Z_2) * \left[b_0 + b_1 \cos\left\{\frac{2\pi(x-\beta t)}{T_s}\right\}\right] \quad (4)$$

where t represents time. The second term in Eq. (4) is the transmission of the moving grating 304 moving at a rate of $\beta/T_s$. The transmitted waves in Eq. (4) can be separated into six different waves. However, the analysis continues with only one of the terms shown below and also leaving out the constant phase term $$\left(\frac{\lambda Z_1}{T_r}\right)^2 : S_1(x, t, Z = Z_1 + Z_2) = \quad (5)$$

$$a_1 b_1 \exp\left\{\frac{i\pi(x-x'+\lambda Z_1/T_r)^2}{\lambda(Z_1+Z_2)} + \frac{i2\pi x'}{T_r} - \frac{i2\pi}{T_s}(x-\beta t)\right\} =$$

$$a_1 b_1 \exp\left\{\frac{i\pi}{\lambda(Z_1+Z_2)}\left[(x-x') + \left(\frac{\lambda Z_1}{T_r} - \frac{\lambda(Z_1+Z_2)}{T_s}\right)\right]^2 + i2\pi x'\left(\frac{1}{T_r} - \frac{1}{T_s}\right) - \frac{i2\pi\beta t}{T_s}\right\}$$

This wave continues to propagate to the second fixed grating 305 which is at a distance $Z_3$ (i.e., at plane Z3) from the moving grating 304. The wavefront at second fixed grating 305 is obtained by replacing the parameter $(Z_1+Z_2)$ by $(Z_1+Z_2+Z_3)$:

$$S_2(x, t, Z = Z_1 + Z_2 + Z_2) = \qquad (6)$$

$$a_1 b_1 \exp\left\{\frac{i\pi}{\lambda(Z_1+Z_2+Z_3)}\left[(x-x') + \left(\frac{\lambda Z_1}{T_r} - \frac{\lambda(Z_1+Z_2)}{T_s}\right)\right]^2 + i2\pi x'\left(\frac{1}{T_r} - \frac{1}{T_s}\right) - \frac{i2\pi\beta t}{T_s}\right\} =$$

$$a_1 b_1 \exp\left\{\frac{i\pi(x-x')^2}{\lambda(Z_1+Z_2+Z_3)} + \frac{i2\pi(x-x')}{(Z_1+Z_2+Z_3)}\left(\frac{Z_1}{T_r} - \frac{(Z_1+Z_2)}{T_s}\right) + i2\pi x'\left(\frac{1}{T_r} - \frac{1}{T_s}\right) - \frac{i2\pi\beta t}{T_s}\right\}$$

The interference between the wave in Eq. (6) and the 0th order wave at plane $Z_3$ is given by $$I(x,t,Z=Z_1+Z_2+Z_3)=|a_0b_0+S(x,t,Z=Z_1+Z_2+Z_3)+S^*(x,t,Z=Z_1+Z_2+Z_3)|^2=(a_0b_0)^2+2a_0b_0a_1b_1\cos\Phi+(a^1b_1)^2\cos^2\Phi \qquad (7)$$

where $$\Phi = \left\{2\pi\left(\frac{x}{(Z_1+Z_2+Z_3)}\left(\frac{Z_1}{T_r} - \frac{(Z_1+Z_2)}{T_s}\right) - \frac{\beta t}{T_s}\right) + 2\pi x'\left[\frac{1}{(Z_1+Z_2+Z_3)}\left(\frac{Z_3}{T_s} - \frac{(Z_2+Z_3)}{T_r}\right)\right]\right\} \qquad (8)$$

Therefore, the interference pattern on the detector (plane) 306 is independent of x' when $$T_r = \frac{(Z_2+Z_3)}{Z_3}T_s. \qquad (9)$$

When the interference pattern on the detector plane is independent of x', the addition of more point sources will increase the signal amplitude and at the same time will not affect the contrast of the interference pattern. The period T of the interference pattern on the detector plane 306 under the condition given in Eq. (9) is given by $$T = \frac{(Z_2+Z_3)}{Z_2}T_s \qquad (10)$$

From Eq. (9) and Eq. (10) it can further be shown that $$\frac{1}{T} + \frac{1}{T_r} = \frac{1}{T_s} \qquad (11)$$

This result is very interesting and beneficial in that:

(1) The interference pattern at the detector plane is independent of $Z_1$, which is the separation between the light source 301 and the first fixed grating 303.

(2) For $Z_2=Z_3$, the grating period $T_r$ and the detector grating period T are equal to each other and are also equal to $2T_s$.

(3) When $Z_2=Z_3$, there is no restriction on the separation between moving grating 304 and first fixed grating 303.

(4) Eq. (11) shows that the relationship between the periods of the gratings is independent of their respective distances. Once $T_s$, T and $T_r$ are known, the distances $Z_2$ and $Z_3$ can be determined using Eq. (9) and Eq. (10).

(5) Although a monochromatic light source is used in this analysis, neither the grating periods T, $T_r$ and $T_s$ nor the distances separating the gratings depend on the wavelength of the light source. Therefore, any suitable incoherent light source, such as an extended incoherent light source, can be used.

In the circumstance that the period T of the grating on top of the detector (i.e., second fixed grating 305) and the period $T_s$ of the moving grating 304 are predetermined and, therefore, known, the value of $T_r$ can be determined from Eq. (11). In addition, if it is given that $Z_3=Z_2+\Delta$, it can be shown that $$Z_2 = \frac{\Delta T_s}{(T-2T_s)}. \qquad (12)$$

Assuming T=43µm and $T_s$=18.75 µm and $\Delta$=0.54 mm, it can be found that $T_r$ 33.247 µm and $Z_2$=1.841 mm.

Because gratings 303 and 304 can, for example, contain numerous harmonic components, it is desirable that the second fixed grating 305 near the detector plane 306 be able to filter out the desired harmonic signal.

Figure 4:
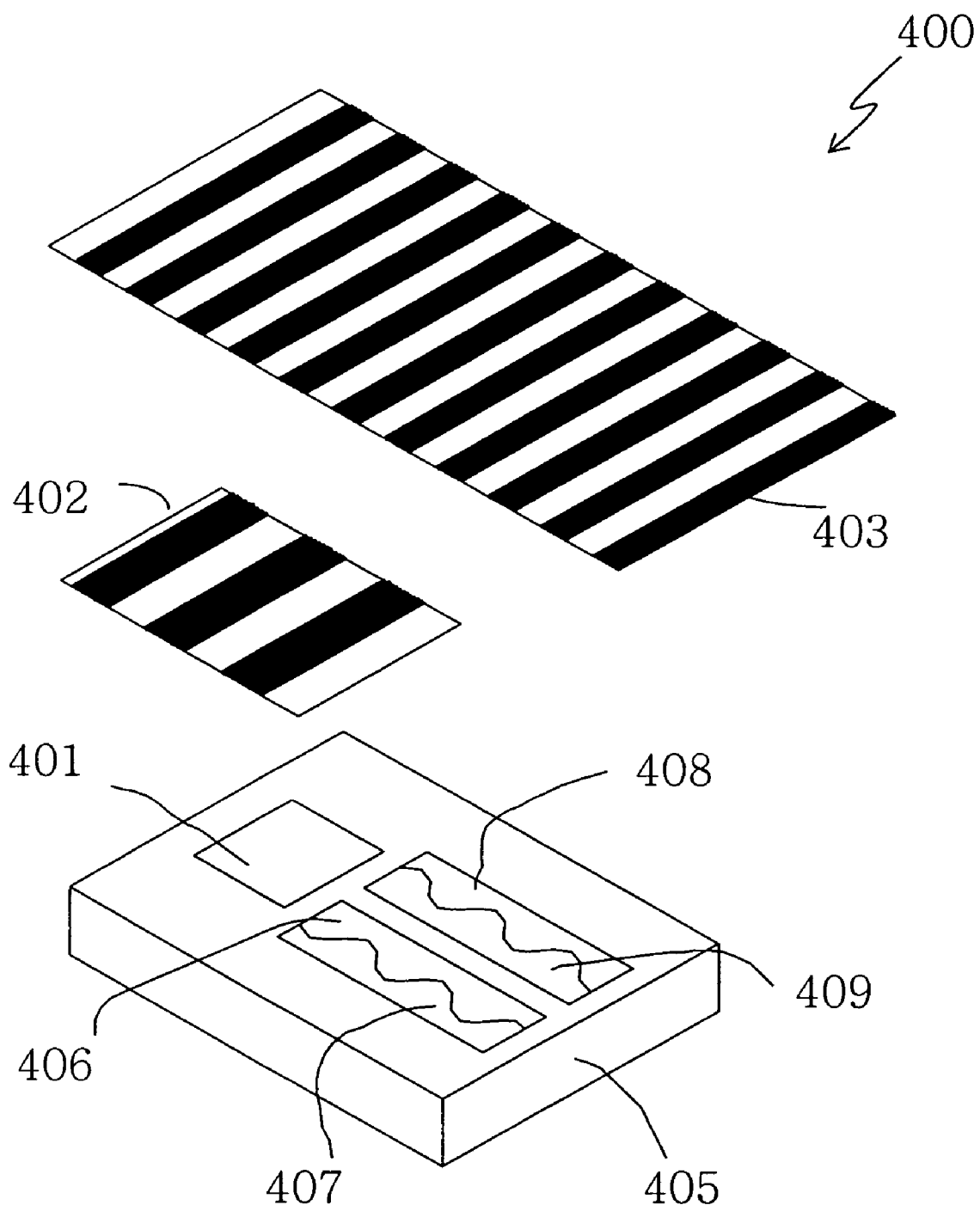
FIG. 4 is a simplified exploded perspective view of another optical device according to the present invention.

FIG. 4 is a simplified exploded view of another embodiment of an optical device 400 (namely and optical position encoder device) in accordance with the present invention. Optical device 400 included an extended light source 401 that is disposed (i.e., mounted) on a photodetector 405 and configured to illuminate a first fixed grating 402. Photodetector 405 includes light sensitive components 406, 407, 408, and 409.

Optical device 400 also includes moving grating 403 and a plurality of second fixed gratings (not shown in FIG. 4) that are etched directly on top of light sensitive elements 406, 407, 408, 409 of photodetector 405. When optical device 400 is in use, light reflecting from moving grating 403 is incident on the second fixed gratings.

In the embodiment of FIG. 4, the second fixed gratings on top of the light sensitive elements 406 and 408 are sinusoidal gratings and have a 90 degree phase shift with respect to each other. In addition, second fixed gratings on top of the light sensitive elements 407 and 409 are sinusoidal gratings and have a 180 degree phase shift with respect to the sinusoidal gratings on top of the light sensitive elements 406 and 408. Because of the sinusoidal shape of the second fixed gratings, output signals from each of the light sensitive elements of the photodetector 405 beneficially receive only one harmonic component.

As will be understood by those of skill in the art, the present invention could be embodied in other specific forms without departing from the essence of the invention. For example, a moving grating (e.g., CD or DVD) could be used that is transparent to the wavelengths of light from the light emitter, with the second reference grating and photodetector being mounted on the far side of the moving grating, opposite the light emitter. Accordingly, the foregoing description is illustrative, but not limiting, of the scope of the invention which is set forth in the following claims.

What is claimed is:

1. An optical device comprising
  a primary grating;
  an incoherent light source disposed opposing a predetermined side of the primary grating;

a first reference grating disposed between the light source and the primary grating;
a photodetector disposed opposing the predetermined side of the primary grating; and
a second reference grating disposed between the photodetector and the primary grating;
wherein the primary grating, the first reference grating and the light source are configured for movement relative to one another;
wherein a period Tr of the first reference grating and a period T of the second reference grating are related to a period $T_s$ of the primary grating by the following formula:

$$\frac{1}{T} + \frac{1}{T_r} = \frac{1}{T_s};$$

such that incoherent light from said incoherent light source remains incoherent as it impinges on said first reference grating, said primary grating and said second reference grating.

2. The optical device of claim 1, wherein the primary grating is a moving grating and the first reference grating and second reference grating are fixed gratings.

3. The optical device of claim 1, wherein the primary grating, light source, first reference grating, second reference grating and photodetector are configured as an optical position encoder device.

4. The optical device of claim 1, wherein the grating is a reflective grating.

5. The optical device of claim 1, wherein the first reference grating and second reference grating are configured for identical relative motion with respect to the primary grating.

6. The optical device of claim 1, wherein the light source is an extended light source.

7. The optical device of claim 6, wherein the extended light source is a light emitting diode (LED).

8. An optical position encoder device comprising:
a moving grating with a period $T_s$;
a photodetector with light sensitive components;
an incoherent light source disposed on the photodetector;
a first fixed grating with spatial period $T_r$ disposed on the light source; and
at least one second fixed grating with period T disposed on the light sensitive components;
wherein the moving grating is moveable relative to the first fixed grating and the light source;
wherein a period Tr of the first reference grating and a period T of the second reference grating are related to a period $T_s$ of the primary grating by the following formula:

$$\frac{1}{T} + \frac{1}{T_r} = \frac{1}{T_s};$$

such that incoherent light from said incoherent light source remains incoherent as it impinges on said first fixed grating, said moving grating and said second fixed grating.

9. The optical position encoder device of claim 8, wherein there is a plurality of second fixed gratings with a fixed phase relationship thereamong such that the photodetector receives only one harmonic component.

10. The optical position encoder device of claim 9, wherein the plurality of second fixed gratings are sinusoidal fixed gratings.

11. An optical device comprising
a primary grating;
an incoherent light source disposed opposing a predetermined side of the primary grating;
a first reference grating disposed between the light source and the primary grating;
a photodetector disposed on a far side of the primary grating; and
a second reference grating disposed between the photodetector and the primary grating;
wherein the primary grating, the first reference grating and the light source are configured for movement relative to one another;
wherein a period Tr of the first reference grating and a period T of the second reference grating are related to a period $T_s$ of the primary grating by the following formula:

$$\frac{1}{T} + \frac{1}{T_r} = \frac{1}{T_s};$$

such that incoherent light from said incoherent light source remains incoherent as it impinges on said first reference grating, said primary grating and said second reference grating.

* * * * *